United States Patent Office.

ADOLPHE TACHAUER, OF MARSEILLES, AND LOUIS BRALY, OF LYONS, FRANCE.

COMPOSITION FOR MAKING MATCHES.

SPECIFICATION forming part of Letters Patent No. 603,666, dated May 10, 1898.

Application filed December 14, 1897. Serial No. 661,849. (No specimens.) Patented in France March 30, 1897, No. 265,487.

*To all whom it may concern:*

Be it known that we, ADOLPHE TACHAUER, a citizen of Hungary, but now residing at Marseilles, and LOUIS BRALY, a citizen of France, residing at Lyons, France, have invented certain new and useful Improvements in Compositions for Manufacture of Matches, (for which we have obtained French Letters Patent No. 265,487, dated March 30, 1897,) of which the following is a specification.

Our invention relates to a compound or composition for the manufacture of matches.

The principal object of our invention is to provide a composition for the manufacture of matches which is free from phosphorus, and in which the matches produced therefrom are inexplosive, but ignite as readily and quickly as the ordinary phosphorous match.

Our invention, stated in general terms, consists of a compound or composition of matter for the manufacture of matches, substantially as hereinafter described and claimed.

The nature, characteristic features, or scope of our invention will be more fully understood from the following description of one mode of producing matches according to our invention.

We first prepare a paste for the manufacture of matches by taking fifteen parts, more or less, of cologne-glue of the best quality, soaking it for twelve hours, more or less, in forty parts of water at a temperature of 15° to 20° centigrade, to which we add three parts, more or less, of acetic acid diluted to about fifteen per cent. Then we prepare three parts of gum-dragon steeped for twelve hours or more in forty-five parts of water and at a temperature of 15° to 20° centigrade, which we add to the above-mentioned liquid preparation and heat by a water-bath to a temperature of 50° to 60° centigrade to complete liquefaction of the two mixed-together preparations, taking care to see that the temperature is maintained normal—that is, the preparations are not heated too much. Then we prepare an intimate mixture containing thirty parts of pounded glass, twenty parts of hyposulfite of lead, ten parts of calcium plumbate, five parts of strontium plumbate, three parts of sulfur, two and one-half parts of metallic aluminium, 0.05 parts of sodium chlorid, and two or three parts of calcium monosulfid, the several ingredients mentioned being preferably finely powdered or sieved before being mixed together, this mixture being incorporated with the liquid glue prepared as above explained, with the addition of one hundred parts of potassium chlorate, also introduced into the presence of the same by degrees with the temperature being maintained at about 50° centigrade. Thus, for example, one-tenth of the mixed materials and ten parts of potassium chlorate are taken and mixed with the glue contained in the mortar, and so on. The paste thus obtained is caused to pass several times through a kneader or similar appliance to render the mixture as thoroughly or intimately mixed as possible, and thereby the paste to become as near as possible homogeneous. The paste thus prepared is used for dipping wooden splints previously sulfurized, stearined, or paraffined, or bougies or wax-match splints or sticks. This operation or act is carried on in the ordinary well-known manner.

In the composition the gum-dragon and the pounded glass may be replaced by similar substances, and in some cases the sulfur may be omitted.

In the manufacture of matches of our new composition stoves are dispensed with for drying of the same, because match sticks or splints dipped with such composition dry very rapidly at ordinary temperature. After several hours the matches may be placed in boxes without any inconvenience, being free from spontaneous ignition and resisting well humidity.

It may be here remarked that in the numerous compositions which have already been proposed and used for the manufacture of matches if some of the hereinbefore-recited substances or materials of the composition of our invention have been employed they have not been so used or combined as explained for the manufacture of matches. These bodies, owing to their oxidizing properties, similar in some respects to potassium chlorate, allow of the combustibility of the mixture in which they enter as an element or elements, without, however, increasing the explosive character of the composition for such purpose.

The chemical decomposition of the ingredients employed in the paste of the calcium plumbate, combined with the strontium plumbate, metallic aluminium, and calcium monosulfid, takes place more slowly than is the case with potassium chlorate. Consequently an intimate mixture of these four bodies or ingredients diminishes the rapidity of ignition and retards combustion, which allows the match stems or splints to become heated to the necessary temperature for required ignition of the match. This result is not obtained with other pastes, the match-heads of which often merely explode without igniting the match.

The use of metallic aluminium in the paste has the effect of absorbing a portion of the oxygen therein, and thus the oxidizable character of the paste is stronger, lessening deflagration.

It may be here remarked that certain proportions of the different ingredients have been given as an example of a good working formula for the making of matches according to our invention; but it should be understood that these proportions may be varied and equally good results be obtained.

Having thus described the nature and objects of our invention, what we claim as new, and desire to secure by Letters Patent, is—

1. A composition for manufacture of matches, consisting of an adhesive substance and a mixture in suitable proportions of the plumbates of calcium and strontium, metallic aluminium, and monosulfid of calcium, substantially as and for the purposes described.

2. A composition for manufacture of matches, consisting of a liquid adhesive substance and a powdered mixture of hyposulfite of lead, plumbates of calcium and strontium, metallic aluminium, sodium chlorid and monosulfid of calcium, in suitable proportions, substantially as and for the purposes described.

3. A composition for manufacture of matches, consisting of an adhesive substance, a powdered mixture of glass, hyposulfite of lead, plumbates of calcium and strontium, sodium chlorid, metallic aluminium, monosulfid of calcium, in suitable proportions, and potassium chlorate at defined temperature and proportion, substantially as and for the purposes described.

In testimony whereof we affix our signatures in presence of two witnesses.

ADOLPHE TACHAUER.
LOUIS BRALY.

Witnesses:
G. DE MESTRAL,
EDWARD P. MACLEAN.